Jan. 9, 1934.  O. U. ZERK  1,942,631
LUBRICATING APPARATUS
Filed May 19, 1930  3 Sheets-Sheet 3
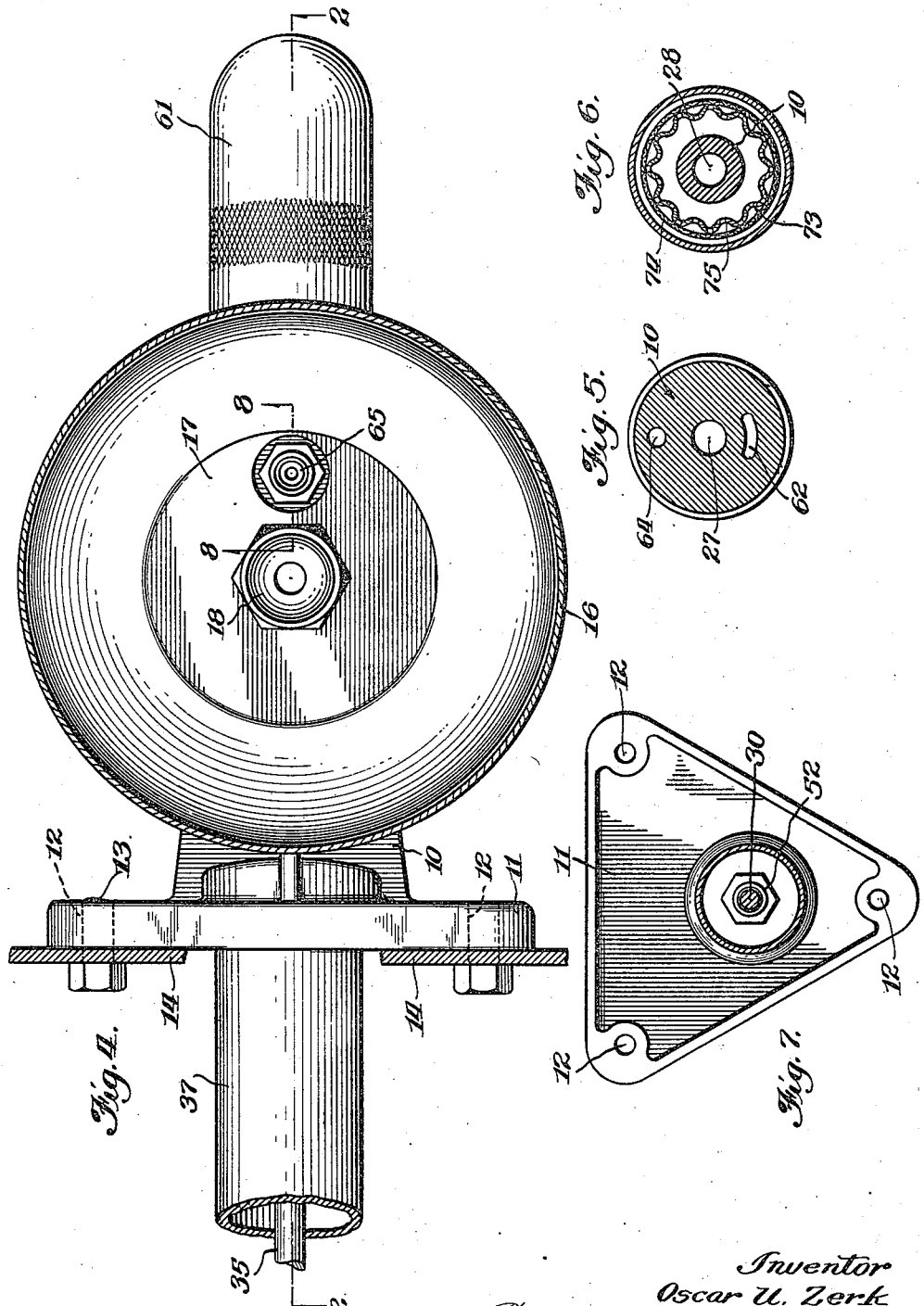

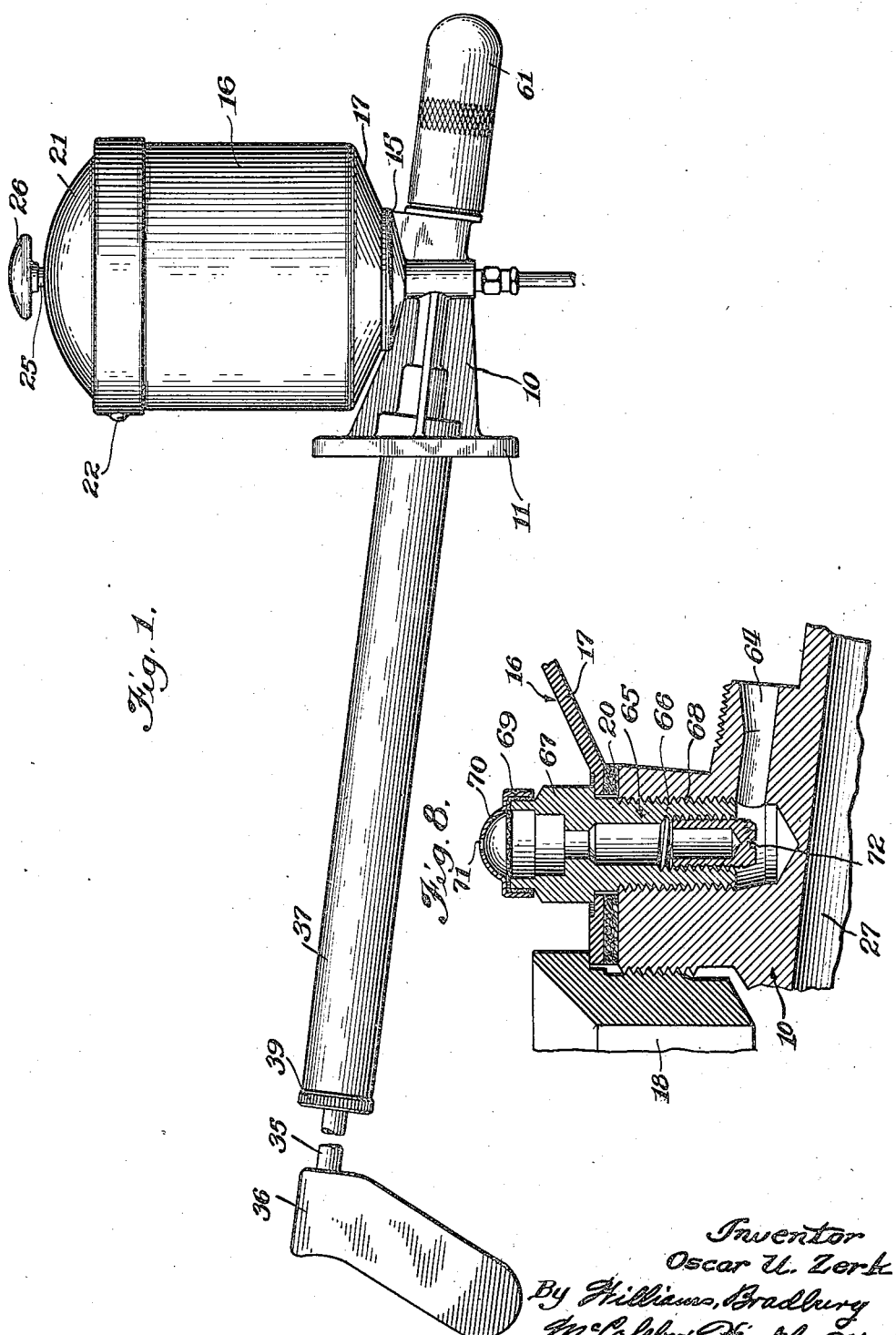

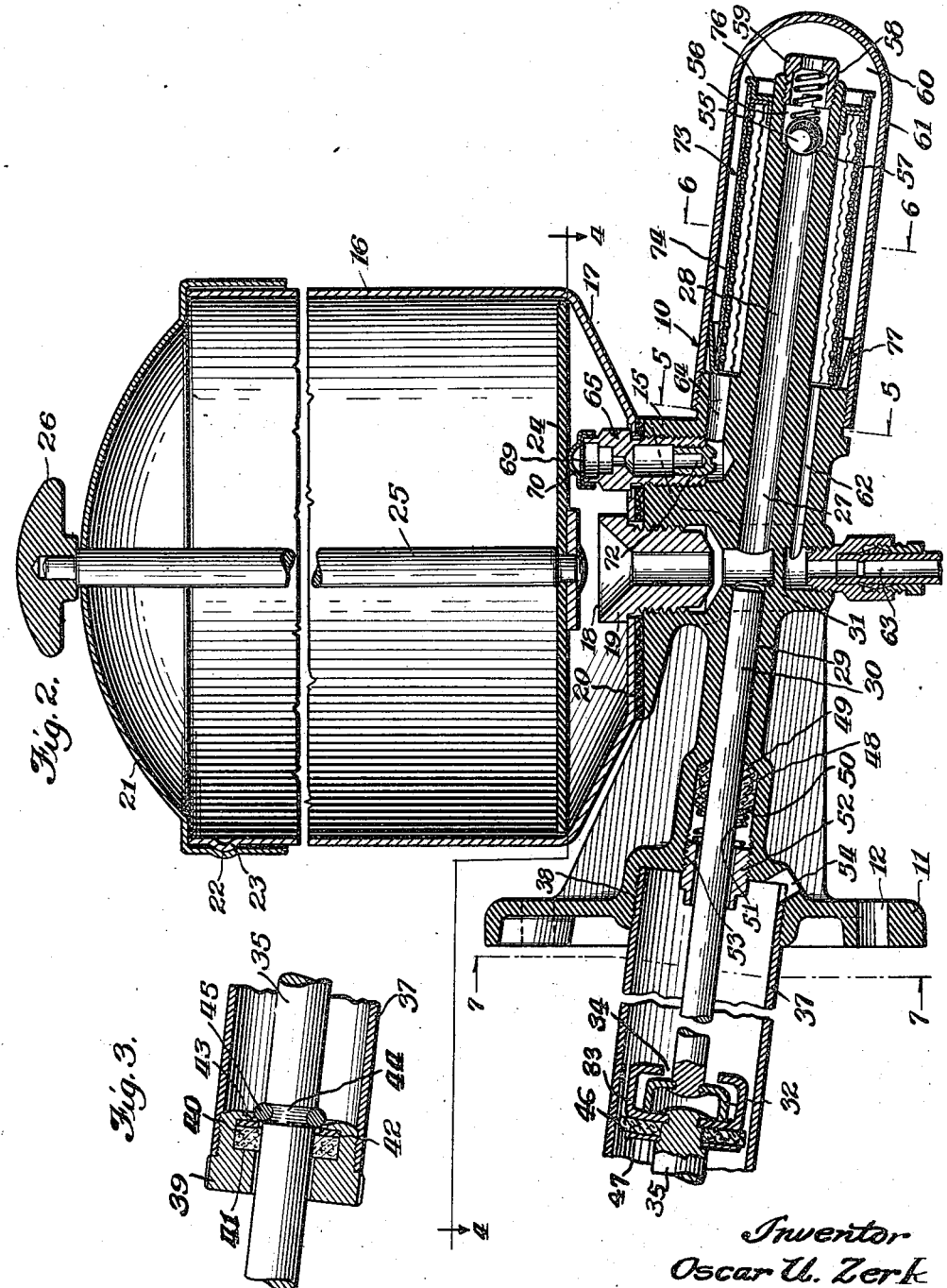

Patented Jan. 9, 1934

1,942,631

UNITED STATES PATENT OFFICE 1,942,631

LUBRICATING APPARATUS

Oscar U. Zerk, Chicago, Ill., assignor to Alemite Corporation, Chicago, Ill., a corporation of Delaware Application May 19, 1930. Serial No. 453,493

9 Claims. (Cl. 184—28)

My invention relates to lubricating apparatus and more particularly to so-called centralized lubricating systems. Centralized lubricating systems comprise, in general, a source of lubricant supply, a pump in communication therewith, a piping system connecting the pump with a plurality of bearings to be lubricated, and metering devices adjacent the bearings to regulate the quantities of lubricant supplied to the respective bearings. My present invention is for a combined lubricant reservoir and pump particularly adapted for use as part of such a centralized lubricating system.

An object of my invention is to provide a new and improved lubricant reservoir.

Another object is to provide a new and improved lubricant pump.

Another object is to provide a new and improved combination lubricant pump and reservoir.

Another object is to provide a new and improved combination pump and reservoir unit.

Another object is to provide a pump and reservoir unit having means for separating any air from the lubricant before it reaches the piping system.

Another object is to provide means for relieving the pressure in the piping system upon cessation of the pump operation.

Another object is to provide a new and improved means for straining the lubricant and removing impurities therefrom.

Another object is to provide a new and improved means for mounting the reservoir on the pump.

Another object is to provide a unitary support for both the reservoir and pump.

Another object is to provide a novel form of piston rod for the pump to insure correct alignment of the pump plunger with the pump cylinder.

Another object is to provide a combined pump and reservoir unit which may be readily adapted for use with either oil or grease.

Other objects and advantages will be apparent as the detailed description of my new and improved lubricating apparatus proceeds.

In the drawings:

Figure 1 is a side elevation of my new and improved lubricating apparatus;

Figure 2 is a sectional elevation of the right-hand part of Figure 1;

Figure 3 is an axial section of a part of the apparatus forming a continuation of the left-hand part of Figure 2;

Figure 4 is a section on the line 4—4 of Figure 2;
Figure 5 is a section on the line 5—5 of Figure 2;
Figure 6 is a section on the line 6—6 of Figure 2;
Figure 7 is a section on the line 7—7 of Figure 2; and Figure 8 is an enlarged view of the bleeder shown in Figure 2.

Referring to the drawings, my invention is illustrated as including a casting 10 having a bracket 11 provided with holes 12 adapted to receive bolts 13 for securing the bracket to a suitable support 14. Where my new and improved lubricating apparatus is used as part of the centralized lubricating system of an automobile it is preferably attached to the dash, although it may be supported on any other part and so arranged that it can be conveniently operated by the driver. Where my new and improved lubricating apparatus is used in connection with other machinery it may be supported directly by the machine which it supplies with lubricant, or by any other suitable support.

The casting 10 has an upwardly extending boss 15 which forms a convenient support for a lubricant reservoir 16, preferably, but not necessarily, made of sheet metal as indicated in the drawings. The sheet metal reservoir has an opening centrally located in its bottom portion 17, through which extends a pipe plug 18 threaded into the casting 10 and serving to clamp the bottom portion 17 between its enlarged head 19 and the boss 15. A packing washer 20 of leather, fiber, cork, or other suitable material, is interposed between the bottom of the reservoir and the boss 15 to insure a lubricant-tight seal therebetween.

The upper end of the reservoir 16 is closed by a cap 21 having a notch 22 adapted to co-operate with a projection 23 on the reservoir 16 to removably interlock the cap with the reservoir.

Where my new and improved lubricating apparatus is intended to be used with grease, I find it desirable to provide a follower piston 24 for resting upon the grease in the reservoir 16 and insuring an even withdrawal of lubricant from all parts of the reservoir. The follower piston 24 is provided with a stem 25 extending through a suitable opening in the cap 21 and terminating at its upper end in a knob 26 which may be grasped for the purpose of lifting the follower piston 24 and thereafter removing the cap 21 from the top of the reservoir or for pressing down on the follower piston 24 to level off the upper surface of the lubricant in the reservoir.

The casting 10 is provided with a transverse bore 27 whose right-hand portion 28 forms the pump cylinder and whose left-hand portion 29 serves as a guide for the pump plunger 30. Intermediate the portions 28 and 29 of the bore 27, the latter is connected with the interior of the reservoir 16 by means of a vertical bore 31 communicating with the lower end of the pipe plug 19 and thence with the interior of the reservoir 16.

The pump plunger 30 terminates at one end in a metal cup 32 riveted or otherwise suitably secured to the end of the pump plunger. The cup 32 is loosely surrounded by a larger cup 33 having a restricted mouth 34 which prevents removal therefrom of the cup 32. The cup 33 is firmly secured to a plunger operating rod 35 terminating in a pistol grip 36 conveniently located so that the operator of my new and improved lubricating apparatus may readily grasp it for reciprocating the pump plunger 30 and thereby discharging lubricant into the piping system and thence to the bearings requiring lubrication. The two cups 32 and 33 provide a loose connection between the plunger 30 and its operating rod 35 and permit the guide portion 29 of the bore 27 to maintain the plunger 30 in proper alignment, regardless of the position of the plunger rod 35. A guide tube 37 surrounds a portion of the plunger 30 and its operating rod 35 and serves to maintain the operating rod in substantial alignment with the plunger 30 and cylinder 28.

One end of the guide tube 37 is threaded into the casting 10, as indicated at 38 in Figure 2 of the drawings, and the other end of the guide tube 37 is closed by a plug 39 carrying an annular washer 40 of leather, fiber, cork, or other suitable material, for effecting an anti-rattling contact between the plug 39 and the operating rod 35. The annular washer 40 is confined between a shoulder 41 and a metal washer 42 held in place by the turned over end 43 of the plug 39. The operating rod 35 is provided with a groove 44 carrying a spring wire 45 which co-operates with the washer 42 to limit outward movement of the operating rod 35 and handle 36. The inner end of the operating rod 35 carries an anti-rattling washer 46 clamped between the cup 33 and a metal washer 47.

A packing 48 surrounds the plunger 30 and is confined between a shoulder 49 in the casting 10 and a dished metal washer 50 receiving the thrust of a spring 51 resting against a plug 52 threaded into the casting 10 at 53. Any lubricant which may leak past the packing 48 eventually finds its way into the guide tube 37 and drains through the opening 54 which is located on the same side of the support 14 as is the reservoir 16. This arrangement prevents any lubricant from passing through the support 14 and reaching a position where it might soil the clothes or hands of the operator.

A check valve 55 is located in a valve chamber 56 at the discharge end of the cylinder 28 and is pressed against its seat 57 by a spring 58 supported by a tubular plug 59 through which the lubricant from the cylinder 28 is discharged. From thence the discharged lubricant passes into a discharge chamber 60 formed between the exterior wall of the cylinder 28 and a substantially cylindrical cap 61 threadedly carried by the casting 10.

A passageway 62 connects the discharge chamber 60 with the inlet end 63 of a piping system leading to the bearings to be lubricated. This piping system is preferably a conventional branched type of system and has metering devices of any well known type in its various branches and adjacent the bearings requiring lubrication. A suitable type of resistance form of metering device is that shown in my co-pending application, Serial No. 207,609, filed July 22, 1927, now Patent No. 1,797,280, and a suitable measuring form of metering device is that shown in my co-pending application, Serial No. 334,681, filed January 24, 1929.

A second passageway 64 connects the discharge chamber 60 with what I prefer to refer to as a bleeder 65, shown most clearly in Figure 8. This bleeder consists of a tubular body 66 having an enlarged upper end 67, located in the bottom of the reservoir 16, and a smaller lower end extending through a suitable opening in the bottom of the reservoir and threaded into the casting 10, as indicated at 68. The upper end 67 of the body 66 carries a strainer screen 69 held in place by a cover 70 having a dome-shaped portion in the top of which is located a small opening 71. The dome-shaped cover 70 with the small opening 71 located in the top thereof, tends to prevent any dirt or other impurities carried in the lubricant in the reservoir 16 from depositing on the strainer 69 and the latter further prevents any impurities which do succeed in passing through the opening 71 from falling into the opening through the tubular body 66.

It should be noted at this point that both the upper end 67 of the bleeder 65 and the upper end of the tubular plug 18 are located some distance above the bottom of the reservoir 16 so that the part of the reservoir below the upper end of the plug 18 and of the bleeder 65 may form a sediment chamber in which any impurities carried by the lubricant may safely collect and not be carried into the system.

In the lower end of the body 66 of the bleeder 65 is carried a resistance plug 72 having an exteriorly threaded surface co-operating with the interior thread of the body 66 to secure the plug in place and also to afford a spiral passageway of small cross section and offering high resistance to flow of lubricant therethrough. This small passageway, however, offers but slight resistance to the passage of air therethrough and since the bleeder 65 and connecting passageway 64 communicate with the highest part of the discharge chamber 60, this bleeder forms a convenient means for permitting the rapid discharge of air from the system. This bleeder permits a slow leakage of lubricant from the discharge chamber 60 back to the reservoir during pump operation and periods of high pressure in the system which follow immediately after such pump operation, and this slow leakage of lubricant serves to rapidly dissipate the high pressure in the system and permit quick return to normal position of the measuring valves adjacent the bearings when this form of metering means is used.

In the discharge chamber 60 I preferably provide a strainer indicated generally by the reference numeral 73. This strainer consists of a fine screen 74 supported by a heavy corrugated screen or foraminous plate 75, as shown most clearly in Figure 6. The screen 74 and its support 75 are carried by a ferrule 76 press fitted over the end of the cylinder 28. The opposite end of the screen 74 is forced into a conical plate 77 which prevents leakage of lubricant around the end of the strainer.

When my new and improved lubricating apparatus is used with oil I preferably dispense with the follower piston 24 and use a resistance plug 150

72 in the bleeder 65 which affords slightly greater resistance to the passage of lubricant therepast. Otherwise my novel apparatus is equally well adapted for operation with either oil or grease as a lubricant.

The operation of my lubricating apparatus is as follows: Assuming that the reservoir 16 and cylinder 28 are full of lubricant and that the plunger 30 is in the position shown in Figure 2, the operator first pushes inwardly on the handle 36 causing the plunger 30 to move into the cylinder 28 and force the lubricant therein past the check valve 55 and into the discharge chamber 60. The operator thereupon moves the handle 36 in the opposite direction, withdrawing the plunger 30 from the cylinder 28 and creating a vacuum therein. As soon as the inner end of the plunger is withdrawn from the cylinder the atmospheric pressure on the follower 24 or on the surface of the lubricant in the reservoir 16, where no follower is used, forces the lubricant from the reservoir and into the cylinder 28 to fill the void caused by the withdrawal therefrom of the plunger 30. Upon again moving the handle 36 toward the guide tube 37, the new charge of lubricant in the cylinder 28 is discharged past the check valve 55 and into the discharge chamber 60 and this operation is repeated until the operator ceases reciprocation of the handle 36.

The lubricant thus discharged into the chamber 60 passes through the strainer 73, which removes all impurities therefrom, and thence most of the lubricant passes through the passageway 62 to the inlet end of the piping 63, from whence it flows to the bearings. The metering devices adjacent the various bearings apportion this lubricant among their respective bearings in the well known way. Any air discharged by the pump goes to the upper end of the discharge chamber 60 and passes through the strainer 73 adjacent the inlet to the passageway 64. From thence this air flows through the passageway 64 to the bleeder 65 and quickly escapes back into the reservoir through the small passageway between the plug 72 and the body 66, since this small passageway offers but slight resistance to the flow of air therethrough. After all air has been discharged from the chamber 60 a small amount of the lubricant flows through the passageway 64 to the bleeder 65 and thence flows very slowly to the small passageway in the bleeder back to the reservoir. While this by-passing of lubricant through the bleeder is so small that it in no wise interferes with the building up of an effective pressure in the piping system during the periods of pump operation, this by-pass of lubricant quickly dissipates the pressure in the pipe line upon the cessation of pump operation and thus permits rapid return of the measuring valves to normal position when this form of metering device is used.

While I have illustrated and described a preferred form of my invention, it is to be understood that my invention is not limited to this exact form but that many modifications and changes may be made therein without departing from my invention, and that the scope of my invention is defined only by the following claims.

What I claim is:

1. In lubricating apparatus of the class described, a casting having a supporting bracket and a pump cylinder formed in a part of said casting, a reservoir mounted on said casting, a passageway connecting said cylinder with said reservoir, a removable cap surrounding the discharge end of said cylinder and threadedly engaged with said casting, said cap affording an annular chamber between itself and the discharge end of said cylinder, a member providing a passageway connecting the upper end of said chamber with said reservoir and having a portion of small cross section forming a high resistance to the flow of lubricant therethrough but offering slight resistance to the flow of air therethrough, a second passageway in said casting communicating with said annular chamber at a point near the bottom thereof, and a cylindrical strainer located in said annular chamber and controlling communication between said annular chamber and the two passageways communicating therewith.

2. In lubricating apparatus of the class described, a source of lubricant supply, a lubricant pump in communication therewith, an annular chamber receiving the discharge from said pump, a cylindrical strainer in said chamber, a ferrule for one end of said strainer and forming a lubricant-tight seal with a supporting part, a conical plate for effecting a lubricant-tight seal with the other end of said strainer, and a discharge passageway communicating with said chamber.

3. In lubricating apparatus of the class described, a casting having a supporting bracket extending in one direction and a pump cylinder extending in the opposite direction, a lubricant reservoir carried by said casting, a passageway connecting said reservoir with the inlet end of said cylinder, a plunger reciprocable in said cylinder, means for reciprocating said plunger, said cylinder having a discharge end surrounded by a cylindrical surface terminating at a shoulder forming one end of a larger cylindrical surface, a cap removably secured to said larger cylindrical surface, said cap forming a discharge chamber for receiving lubricant ejected from said cylinder, and a cylindrical strainer between said cap and said smaller cylindrical surface.

4. In lubricating apparatus of the class described, a lubricant pump, a lubricant reservoir unitary therewith and supported thereby, a hollow plug providing a lubricant transfer passage between said reservoir and said pump, and adapted to clamp said reservoir to said pump, a chamber surrounding the discharge end of the pump and adapted to receive the discharge therefrom, a pipe in communication with said chamber, a bleeder establishing communication between said chamber and said reservoir, and a single strainer in said chamber disposed between the outlet of said pump and the inlet to said pipe and said bleeder for removing impurities from the lubricant passing to said pipe and said bleeder.

5. In lubricating apparatus of the class described, a lubricant pump, a lubricant reservoir unitary therewith and supported thereby, a hollow plug providing a lubricant transfer passage between said reservoir and said pump, a bracket for securing said pump and reservoir to a supporting member, a chamber defined by the external surface of the discharge end of the pump and the internal surface of an enveloping cap therefor, for receiving the discharge from said pump, a bleeder communicating with the upper part of said chamber and leading back to said reservoir, a pipe communicating with the lower part of said chamber, and a strainer for filtering the entire discharge of said pump before the entrance of the same into said pipe and said bleeder.

6. In lubricating apparatus of the class described, a lubricant reservoir, a lubricant pump in communication therewith, a hollow plug for retaining said reservoir on said pump and providing a lubricant transfer passage between said reservoir and said pump, a cylindrical cup enveloping the discharge end of said pump and providing a chamber therebetween for receiving the discharge from said pump, a bleeder establishing communication between said source of supply and said chamber comprising a hollow member providing auxiliary means for retaining said reservoir on said pump, a resistance unit secured therein, a dome shaped dirt separator over said member, and a strainer located at the entrance to each end of said bleeder.

7. In lubricating apparatus of the class described, a lubricant pump having a part for attachment to a supporting member, a reservoir mounted on said pump, said pump having a cylinder and a piston reciprocable therein, means establishing communication between said reservoir and the inlet end of said cylinder and clamping said reservoir to said pump, and a member having a restricted passageway therethrough and a dome shaped dirt separator thereover providing a bleeder between the discharge end of said pump cylinder and said reservoir and also securing said reservoir to said pump.

8. In lubricating apparatus of the class described, a lubricant pump, a lubricant reservoir mounted therewith and supported thereby, means establishing communication between said pump and said reservoir and clamping said reservoir to said pump, a bleeder establishing communication between the discharge side of said pump and the bottom of said reservoir and also securing said reservoir to said pump, and a dome shaped dirt separator over said bleeder, said separator having an opening in the top of its dome shaped portion.

9. In lubricating apparatus of the class described, a combined pump and reservoir unit comprising a body member provided with a pump cylinder, a lubricant reservoir mounted with said body member and supported thereby, a hollow plug clamping said reservoir on said body member and providing a lubricant transfer passage between said reservoir and said pump cylinder, a cup shaped member enveloping the discharge end of said pump cylinder for providing a chamber, a bleeder in communication with said chamber and also securing said reservoir to said body member, a pipe in communication with said chamber and a strainer interposed between the discharge end of said pump cylinder and the entrance to said bleeder and pipe.

OSCAR U. ZERK.